May 27, 1924.

B. P. HAMILTON

DETECTING CIRCUITS

Filed July 3, 1920

1,495,226

INVENTOR
B.P.Hamilton
BY
ATTORNEY

Patented May 27, 1924.

1,495,226

UNITED STATES PATENT OFFICE.

BAXTER P. HAMILTON, OF BROOKLYN, NEW YORK, ASSIGNOR TO AMERICAN TELEPHONE AND TELEGRAPH COMPANY, A CORPORATION OF NEW YORK.

DETECTING CIRCUITS.

Application filed July 3, 1920. Serial No. 393,779.

*To all whom it may concern:*

Be it known that I, BAXTER P. HAMILTON, residing at Brooklyn, in the county of Kings and State of New York, have invented certain Improvements in Detecting Circuits, of which the following is a specification.

This invention relates to receiving apparatus and more particularly to receiving apparatus to be used in connection with transmission systems in which carrier currents are employed.

Heretofore, when the carrier currents have been employed for the transmission of telegraphic signals either over wires or through the ether, it has been customary to translate the high frequency carrier currents into low frequency signals by means of a detector, such as a vacuum tube detector, in the output circuit of which a relay is included. Since detectors of this type operate by controlling the flow of a direct current, it has heretofore been the general practice to use a neutral relay as the receiving instrument.

One of the objects of this invention is to provide a detector arrangement in which the advantages of the use of a polar relay for recording received signals may be obtained. Another object of the invention is to provide a detecting circuit in which the received telegraphic signals will not be biased by changes in the battery voltage applied to the detector.

Figure 1:
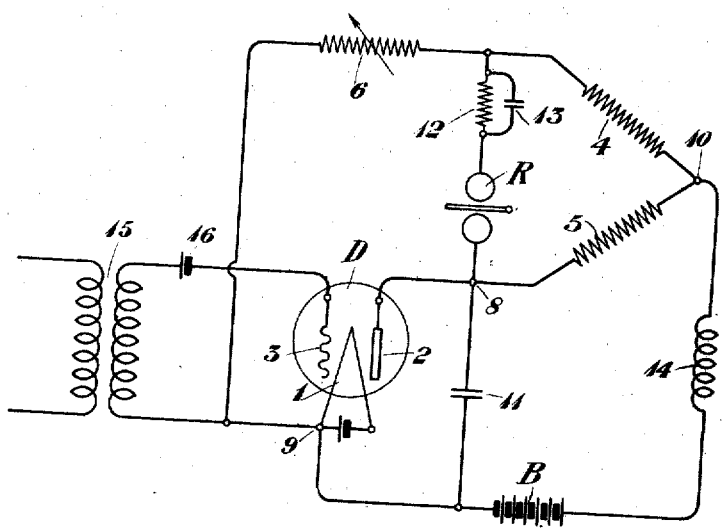
Figure 2:
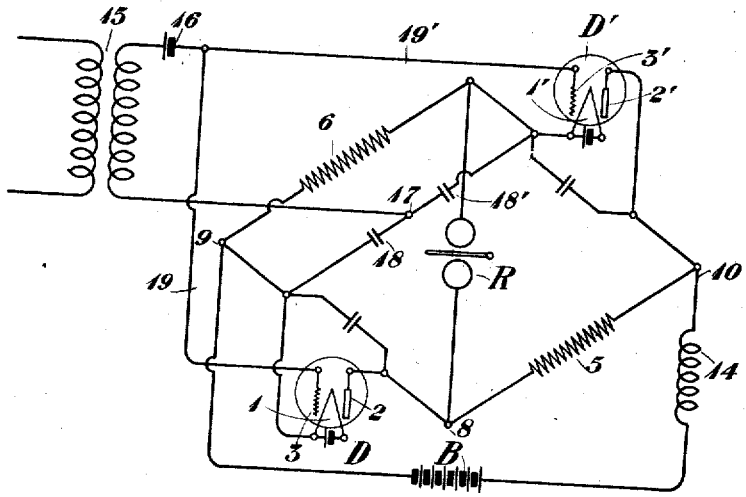

Other and further objects of the invention will be clear from the following description, when read in connection with the accompanying drawing, in which Figure 1 illustrates one form of detector circuit arrangement embodying the invention and in which Fig. 2 illustrates a modified form of circuit arrangement embodying the invention.

Referring to Fig. 1, D designates a vacuum tube detector comprising a filament 1, plate 2 and controlling electrode or grid 3. The filament and plate electrodes of the detector are connected to form the unknown or "X" arm of a Wheatstone bridge arrangement in which resistances 4 and 5 constitute the bridge arms and a resistance 6 constitutes the potentiometer arm of the bridge. A polar receiving relay R is connected across junction points 7 and 8 of the bridge, while a battery or other source of direct current B is connected across points 9 and 10 of the bridge. The battery B serves to supply the space current of the detector D. A condenser 11 is shunted across the output circuit of the detector to form a path of low impedance for components of carrier frequency appearing in the output circuit of the detector, it being understood that only the low frequency components corresponding to the signaling currents are effective to operate the polar relay R. If desired, a resistance 12 shunted by a condenser 13 may be included in series with the polar relay and an inductance 14 may be included in series with the battery B.

The input circuit of the detector D is connected between the filament 1 and the grid 3 and includes the primary of a transformer 15, through which carrier currents modulated in accordance with signals may be impressed upon the detector. A battery or other source of direct current 16 may also be included in the grid circuit, in order to adjust the potential of the grid to any desired value.

Under normal conditions, when signals are not being received, the potential of the grid is adjusted by means of the source 16, so that the impedance between the filament 1 and plate 2 will have the desired value. When carrier currents modulated in accordance with the signal pulse are impressed upon the grid circuit, the impedance between the filament 1 and the plate 2 will be changed by an amount depending upon the maximum amplitude of the signal pulse. The bridge circuit is not balanced under normal conditions, but the resistance 6 is adjusted to a value intermediate between the impedance of the tube 9 when signals are not being received and its impedance when signals are being received. Consequently, in the absence of a signal impulse the bridge is unbalanced, so that current flows through the polar relay R in one direction. When a signal pulse is received, however, the impedance of the tube is so changed that the bridge is unbalanced in the opposite sense, so that the current flows through the polar relay R in the opposite direction. In this manner the armature of the polar relay may be shifted back and forth in response to marking pulses and spacing or no-current pulses.

It will be understood, of course, that the signal pulses just referred to in connection with the operation of the circuit are detected pulses corresponding to the telegraph signal originating at the distant station. The carrier frequencies which, as is well understood, appear in the output circuit of the detector, are prevented from affecting the polar relay R by being shunted through the path including the condenser 11, which offers a very low impedance to carrier frequencies but has a relatively large impedance for current of telegraphic dot frequency and the reltively low frequency harmonics thereof. It will also be apparent that since the detector is included as one of the elements of a Wheatstone bridge arrangement, changes in the potential of the battery B will not affect the relative strength of the current flowing through the polar relay R in opposite directions, since the relative values of these currents depend upon the adjustment of the resistance 6 with respect to the impedance of the tube during signaling and non-signaling intervals.

A modified arrangement is illustrated in Fig. 2. This modification differs from that illustrated in Fig. 1 in that a second detector D', having a filament 1', plate 2' and grid 3', is substituted for the arm 4 of the bridge, so as to increase the unbalancing of the bridge circuit in response to signals. The input circuit, including the secondary of the transformer 15, is connected in parallel to the grids and filaments of the two tubes, one terminal of the secondary being connected to the midpoint 17 of the connection between the filament 1 and the filament 1', condensers 18 and 18' being included in said connections on either side of the point 17, in order to prevent the filaments 1 and 1' from being connected through a dead short-circuit at direct current and signaling frequencies. The condensers, however, may be so adjusted as to readily pass carrier frequencies. The other terminal of the secondary of the transformer is connected through battery 16 to parallel conductors 19 and 19' leading to the grids 3 and 3'.

By means of the battery 16 the grid potentials of the two tubes may be so adjusted that when no signals are being received the bridge will be unbalanced in such a sense that current will flow through the polar relay R in a given direction. When carrier currents modulated in accordance with the signal are impressed upon the two grids, however, the impedances of the tubes will be changed so that the bridge is unbalanced in the opposite sense and current will flow through the relay R in the opposite direction.

It will be obvious that the general principles herein disclosed may be embodied in many other organizations widely different from those illustrated without departing from the spirit of the invention as defined in the following claims.

What is claimed is:

1. A receiving apparatus comprising a Wheatstone bridge circuit, a detector constituting one arm of the bridge and a polar receiving relay connected across two junction points of the bridge, the fixed arms of the bridge having impedances of such value as compared with the impedances of the detector when signals are not being received that the bridge will be unbalanced in one sense, and when the impedance of the detector is changed in response to signals the bridge will be unbalanced in the opposite sense.

2. A receiving apparatus comprising a Wheatstone bridge circuit, a vacuum tube detector constituting one arm of the bridge and a polar receiving relay connected across two junction points of the bridge, the impedances of the fixed arms of the bridge being of such value with respect to the impedance of the tube when signals are not being received that the bridge will be unbalanced in one sense, but when the impedance of the tube is changed in response to signals the bridge will be unbalanced in the opposite sense.

3. A receiving apparatus comprising a Wheatstone bridge circuit, a detector constituting one arm of the bridge, a polar receiving relay connected across two junction points of the bridge, and a source of current connected across the opposite junction points of the bridge, the impedances of the fixed arms of the bridge having such values with respect to the impedance of the detector when signals are not being received that the bridge will be unbalanced in such a sense as to cause current to flow through the polar relay in one direction, but when the impedance of the detector is changed in response to received signals, the bridge will be unbalanced in the opposite sense, so that current will flow through the polar relay in the opposite direction.

4. A receiving apparatus comprising a Wheatstone bridge circuit, a vacuum tube detector constituting one arm of the bridge, a polar relay connected across two junction points of the bridge, and a source of current connected to the opposite junction points, the impedances of the fixed arms of the bridge being of such values with respect to the impedance of the tube when no signals are being received that the bridge will be unbalanced in such a sense as to cause current to flow through the polar relay in one direction, but when the impedance of the tube is changed in response to received signals the bridge will be unbalanced in the opposite sense, so that current flows through the polar relay in the opposite direction.

In testimony whereof, I have signed my name to this specification this 28th day of June 1920.

BAXTER P. HAMILTON